UNITED STATES PATENT OFFICE.

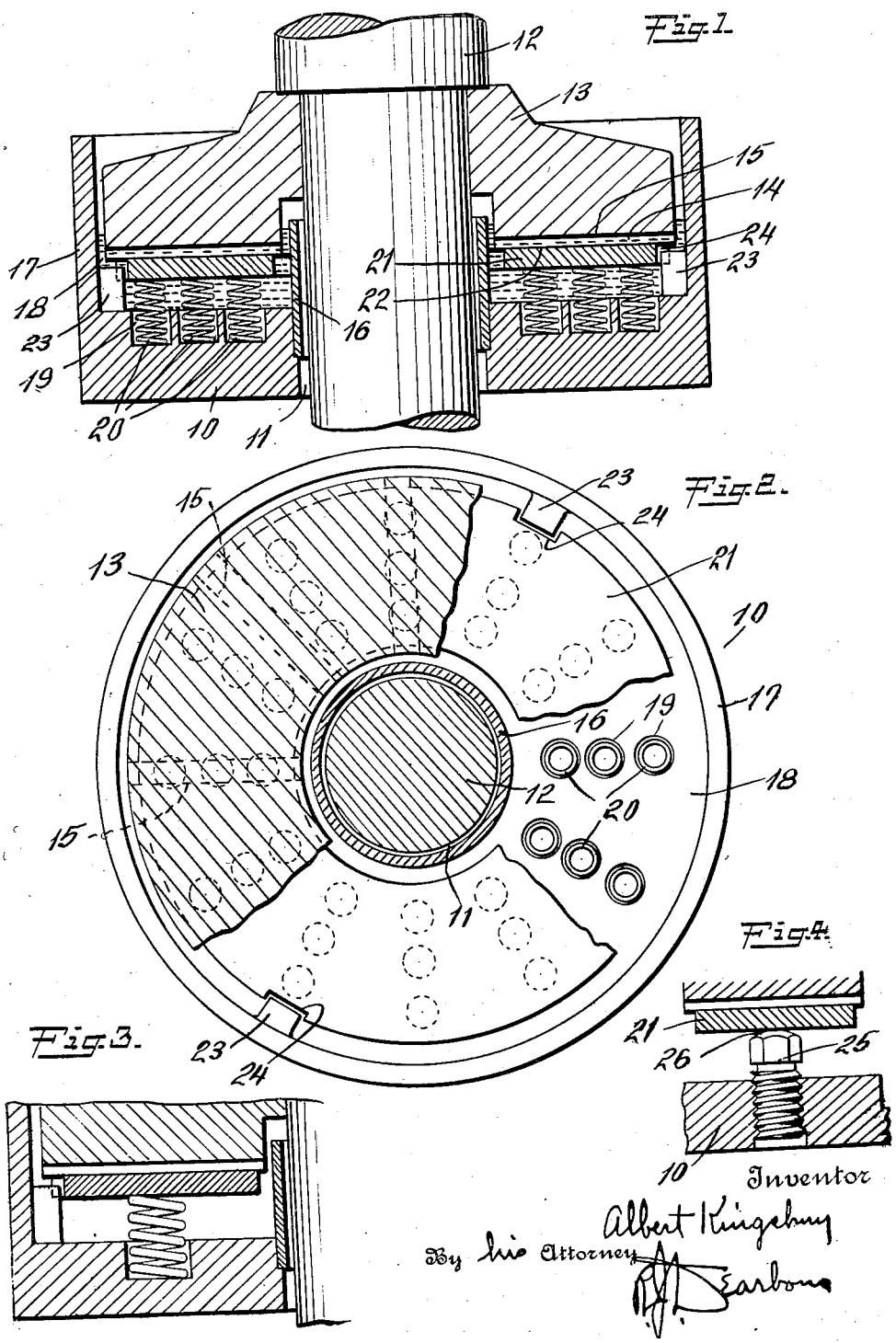

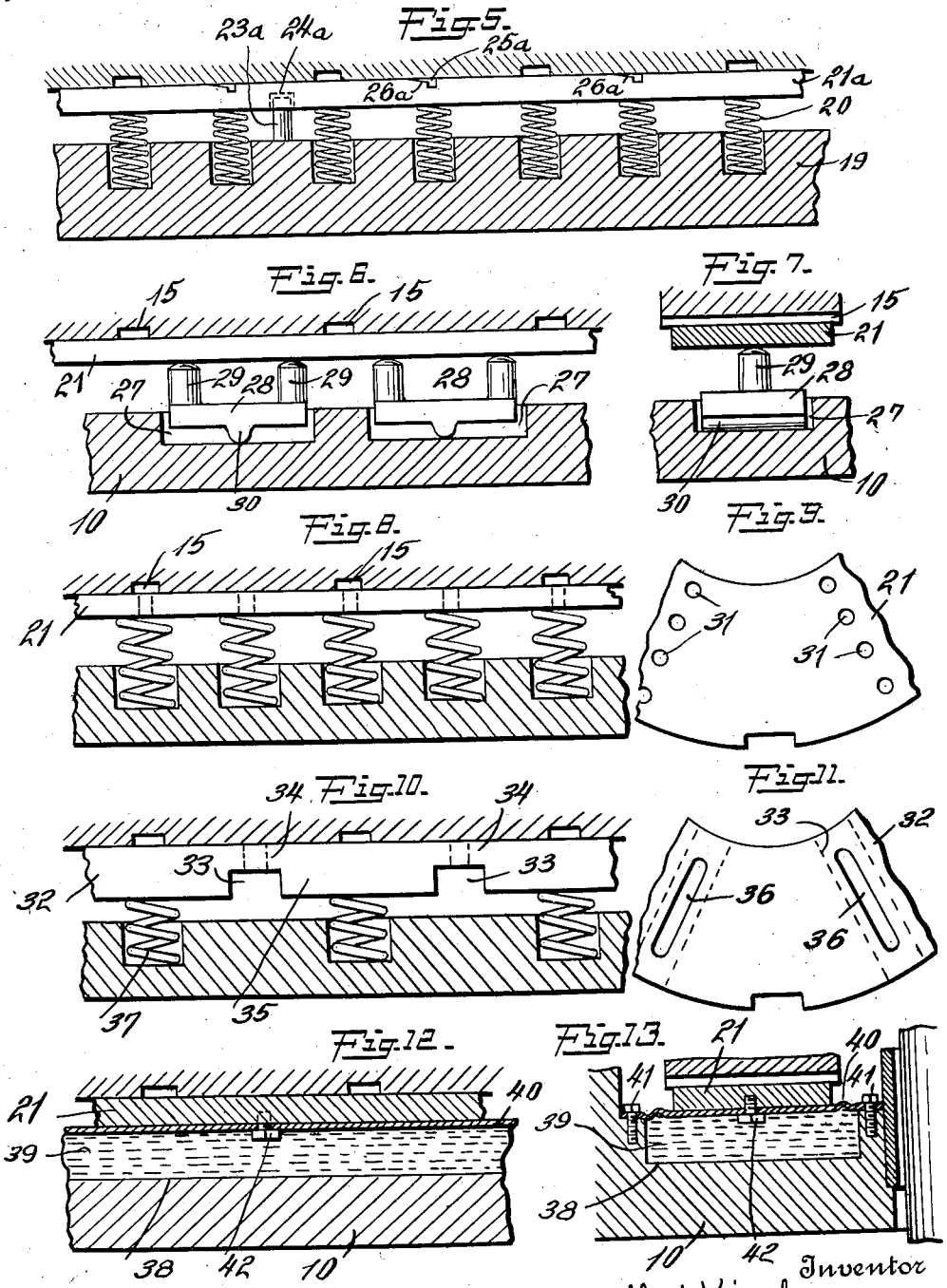

ALBERT KINGSBURY, OF PITTSBURGH, PENNSYLVANIA.

THRUST-BEARING.

1,349,157.

Specification of Letters Patent.   Patented Aug. 10, 1920.

Application filed May 1, 1917.   Serial No. 165,685.

*To all whom it may concern:*

Be it known that I, ALBERT KINGSBURY, a citizen of the United States of America, and a resident of Pittsburgh, Allegheny county, and State of Pennsylvania, have invented certain new and useful Improvements in Thrust-Bearings, of which the following is a specification, reference being had to the accompanying drawings, forming a part thereof.

My invention relates to bearings and while my invention is not limited to any particular type of bearing it may well be embodied in a bearing of the general character disclosed in my earlier patents (*e. g.* Patent Nos. 947,242, 1,117,499, etc.) in which the lubricating fluid is automatically and continually forced in operation from a relatively low to a relatively high pressure portion of the bearing, and a film of oil is thereby automatically maintained between the bearing surfaces; and the latter are further automatically maintained in correct operative position relative to each other, by being so mounted that at least one of them can tilt radially as well as circumferentially.

One object of my invention is to provide a bearing having the above described characteristics that shall be particularly simple and inexpensive to construct, and that shall be comprised of relatively few parts. Another object of my invention is to provide a structure of the character specified which comprises two coöperating surface bearing members, one of which is relatively rigid and the other of which is continuous and relatively flexible, or elastic, one or both of the said members having transverse oil slots or apertures in its bearing surface; and means for yieldingly supporting the flexible or elastic bearing member and equalizing the pressure thereon, so as to permit of the automatic formation and maintenance of a series of symmetrically disposed wedge-shaped oil films between the thrust engaging surfaces when the bearing is in operation.

Another object of my invention is to provide a thrust bearing comprising a member having an annular bearing surface provided with oil carrying slots or apertures and a coöperating continuous flexible bearing member which may have an uninterrupted annular bearing surface, and means for yieldingly supporting the flexible member to permit the oil supplied to the apertures or slots to enter the bearing surfaces by flexing the bearing member to accommodate the variations or gradations in the oil pressures existing at different parts of the bearing surfaces.

By thus providing a yieldingly supported flexible bearing member, and means for supplying oil to the bearing surfaces at spaced points therein, the oil (provided the bearing surfaces are flooded) is forced or wedged between the bearing surfaces when the bearing is in operation so as to produce what at any one instant might be accurately termed a plurality or succession of oil wedges. The oil of which these wedges is composed is under high pressure and they obviously cannot exist in case the bearing surfaces are continuous unless one of the bearing members is flexible so that it is free to be distorted by the liquid pressure.

The position of the oil wedges in the bearing are dependent upon the location and arrangement of the oil grooves in the bearing members and upon the relative movement of the coöperating bearing surfaces. If the rigid member is provided with grooves, and is made the rotor or rotating element, the oil wedges are not at rest but move with the rotor, so that there is produced in the flexible ring an endless succession of waves. The thickness of the oil wedges and the amplitude of the waves referred to are, of course, very small.

If the grooves are in the flexible ring and none is provided in the rigid rotor, the oil wedges are stationary. This is also true if the flexible ring is rigidly supported at spaced points as hereinafter explained in connection with some of the embodiments of my invention.

In any event the structure permits the oil to be automatically and continuously forced between the bearing surfaces in substantially the same manner as was disclosed in my earlier patents hereinbefore mentioned so that the wear and the heating of the bearing is negligible except for a slight wear which usually occurs at starting and stopping.

In order that my invention may be thoroughly understood, I will now proceed to describe the same in the following specification, and then point out the novel features thereof in appended claims.

Referring to the drawings:

Figure 1 is a sectional elevation of a bearing arranged and constructed in accordance with my invention and forming an embodi- Fig. 2 is a sectional plan view of the same bearing with certain of the parts broken away.

Figs. 3 and 4 are partial sections showing slightly modified structures which embody my invention.

Fig. 5 is a development into a single plane of a bearing structure of the same general kind as those of Figs. 1 and 3 with the base and the rotor shown in section.

Fig. 6 corresponds to Fig. 5 and shows an embodiment of my invention in which rocking supports are substituted for springs.

Fig. 7 is a transverse section taken at right angles to Fig. 6.

Fig. 8 corresponds to Fig. 5 and shows a still further embodiment of my invention.

Fig. 9 is a partial plan view of the flexible bearing member of Fig. 8.

Still another embodiment of my invention is shown in Figs. 10 and 11 which correspond respectively to Figs. 8 and 9.

Figs. 12 and 13 correspond respectively to Figs. 6 and 7 and show another embodiment of my invention.

Special reference may first be had to Figs. 1 and 2 in which 10 represents a stationary base having a central opening 11 through which a rotatable shaft 12 extends. A thrust collar 13 is secured to the shaft and has an annular bearing surface 14 in which are radial oil slots or apertures 15. A sleeve 16 loosely surrounds the shaft 12 and is affixed to the base. It coöperates with an outer wall or flange 17 of the base to provide an oil pocket 18. The upper surface of the base is provided with a plurality of holes or recesses 19 in which springs 20 are mounted. A continuous relatively thin flexible bearing ring 21 has a bearing surface 22, which coöperates with the surface 14 of the thrust collar, and is supported on the springs 20, the arrangement of parts being such that the ring is adapted to be waved or distorted slightly by the oil pressures exerted between the bearing surfaces when the bearing is in operation.

The base has one or more lugs 23 which engage notches 24 in the ring and prevent rotation. Any other suitable means may be utilized for preventing the rotation of the ring without interfering with its freedom of movement.

In the embodiment above described I have shown a large number of springs but it is evident that a small number may be used as indicated in Fig. 3, or some other means may be employed for supporting the ring at spaced points so as not to materially interfere with its flexing. For example, in Fig. 4, I have shown an adjustable bolt 25 screwed into the base 10 and having a spherically curved top 26 on which the flexible ring 21 rests.

In the structure of Fig. 4 the flexible ring is supported at spaced points by rigid members and consequently the oil wedges produced when the bearing is in operation do not rotate but are relatively stationary.

The spacing of the springs circumferentially may be as shown in Fig. 5, but the springs may be closer together or farther apart in either or both directions, dependent upon the load which the bearing is called upon to support, and the strength of the individual springs, etc.

In the latter embodiment the flexible bearing member 21ª is held against rotation by lugs or pins 23ª which extend upwardly from the base and fit loosely into holes or recesses 24ª in the member 21ª. The member 21ª has radial oil slots 25ª one or both edges of which may be slightly beveled as shown at 26ª in Fig. 5.

In Fig. 6, the base 10 is provided with apertures 27 in which are disposed rockers 28 having upwardly extending projections 29 upon which the flexible ring 21 is mounted and downwardly extending pivot projections 30 which rest upon the bottoms of the recesses.

The flexible ring member 21 is continuous and uninterrupted in structure, and it may have either a plane or uninterrupted bearing surface, as shown in Figs. 1 to 4 and 6 and 7, or it may have slots as shown in Fig. 5 or spaced perforations 31 as shown in Figs. 8 and 9. Through these the oil flows to the bearing surfaces as well as through the oil slots or recesses 15 of the thrust collar.

Referring to Figs. 10 and 11, instead of the ring 21, an annular bearing member 32 is employed which has radial slots or recesses 33 in its under side, and which consists of flexible portions 34 between relatively rigid portions 35. The flexible portions may also be provided with slots, apertures or openings 36, if desired.

The annular bearing member may be mounted in any suitable manner, as, for example, upon the springs 37.

Referring now to Figs. 12 and 13, the base 10 is here shown as provided with an annular channel 38 in which is disposed some non-compressible fluid such as oil although I prefer to utilize a heavy grease indicated at 39. Soft rubber or any other suitable matter which acts like a non-compressible fluid may be utilized.

A diaphragm ring 40 is secured to the base by bolts 41 and closes the channel. The bearing ring 21 is in this case mounted on and secured to the diaphragm 40 by bolts 42 or other suitable means.

The operation of the bearing in each embodiment will be clearly understood from the foregoing discussion.

In a two member bearing having one flexible member, particularly good results may be obtained when one member has a continuous uninterrupted bearing surface and the other is provided with slots, apertures or the like for supplying oil to the bearing surface. My invention is not limited to such an arrangement however.

And it is possible as already explained, to use grooves of the same character—with either beveled or unbeveled edges—in either one or both of the bearing members: and if both members are grooved there is a superposition of rotating and stationary oil wedges. The use of beveled edge grooves in this construction is particularly advantageous in assisting in the flexing of the thin continuous ring member and thereby producing the desired wedge shaped oil films between the bearing surfaces.

What I claim is:

1. A thrust bearing comprising relatively rotatable bearing members one of which consists of a continuous flexible ring having an annular bearing surface, and means for supporting the ring to permit it to be flexed in response to the varying pressures due to the wedging action of the oil between the bearing surfaces when the said surfaces are in relative movement.

2. A bearing comprising a member having an annular bearing surface with one or more oil apertures therein, a relatively thin flexible continuous bearing member having a coöperating bearing surface, and yielding means for supporting said flexible member.

3. A bearing comprising a member having an annular bearing surface with one or more oil apertures therein, a relatively thin flexible continuous bearing member having a coöperating bearing surface, and springs tending to press the bearing members together without interfering with the flexing of the flexible member in response to the varying pressures due to the wedging action of the oil between the bearing surfaces when the latter are in relative movement.

4. A bearing comprising a member having an annular bearing surface with one or more oil apertures therein, a relatively thin flexible continuous bearing member having a coöperating bearing surface, and a plurality of circumferentially distributed springs for supporting the flexible member.

5. A bearing comprising a member having an annular bearing surface having radially disposed openings circumferentially spaced therein, a coöperating bearing member composed of a relatively thin flexible annulus having an uninterrupted bearing surface, and yielding means for supporting the flexible annulus.

6. A bearing comprising a member having an annular bearing surface with one or more oil apertures therein, a relatively thin flexible coöperating bearing member having an uninterrupted bearing surface, and yielding means for supporting said flexible member.

7. A bearing comprising a member having an annular bearing surface with one or more oil apertures therein, a relatively thin flexible coöperating bearing member having an uninterrupted bearing surface, and springs tending to press the bearing members together without interfering with the flexing of the flexible member in response to the varying pressures due to the wedging action of the oil between the bearing surfaces.

8. A bearing comprising a member having an annular bearing surface with one or more oil apertures therein, a relatively thin flexible coöperating bearing member having an uninterrupted bearing surface, and a plurality of circumferentially distributed springs for supporting the flexible member.

9. A bearing comprising a relatively rigid member having an annular bearing surface and a continuous relatively flexible annular member having a coöperating bearing surface and yielding means for supporting the flexible member, at least one of said bearing surfaces having apertures through which oil is delivered to the surfaces.

10. A thrust bearing comprising relatively rotatable bearing members one of which consists of a continuous flexible ring having an annular bearing surface, and yielding means for supporting said ring to permit it to be flexed in response to the wedging action of the oil between the bearing surfaces.

11. A thrust bearing comprising relatively rotatable bearing members one of which consists of a continuous flexible ring having an annular bearing surface, and resilient means for supporting said ring and equitably distributing the bearing pressure on said surfaces.

12. A thrust bearing comprising relatively rotatable bearing members one of which consists of a relatively thin continuous flexible ring having an annular bearing surface, and a plurality of springs for supporting said flexible ring.

In witness whereof, I have hereunto set my hand this 28th day of April, 1917.

ALBERT KINGSBURY.